(12) United States Patent  (10) Patent No.: US 6,931,857 B2
Irwin et al.  (45) Date of Patent: Aug. 23, 2005

(54) ROTOR INLET TEMPERATURE CONTROL FOR TURBO MACHINE

(75) Inventors: Craig W. Irwin, Jupiter, FL (US); Richard W. McBride, Palm Beach Gardens, FL (US); Kenneth D. Olson, Royal Palm Beach, FL (US); Carl F. Simmons, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 183 days.

(21) Appl. No.: 10/448,900

(22) Filed: May 30, 2003

(65) Prior Publication Data

US 2004/0237503 A1 Dec. 2, 2004

(51) Int. Cl.$^7$ ................................................ G02C 9/48
(52) U.S. Cl. ........................................ 60/773; 60/39.281
(58) Field of Search ...................... 60/772, 773, 39.281

(56) References Cited

U.S. PATENT DOCUMENTS

| | | | | |
|---|---|---|---|---|
| 6,393,355 B1 | * | 5/2002 | Muramatsu | ................. 701/100 |
| 6,708,496 B2 | * | 3/2004 | Gadde et al. | ................. 60/773 |
| 2004/0011053 A1 | * | 1/2004 | Murakami et al. | ............ 60/773 |
| 2004/0055273 A1 | * | 3/2004 | Hirayama et al. | ....... 60/39.281 |

* cited by examiner

Primary Examiner—Ehud Gartenberg
(74) Attorney, Agent, or Firm—Bachman & LaPointe, P.C.

(57) ABSTRACT

A method of synthesizing rotor inlet temperature in a turbine comprising the steps of determining a burner fuel flow (WFGG), a burner inlet pressure (PS32), and a compressor discharge temperature (T3) of a turbine, calculating a ratio unit parameter from the burner fuel flow, the burner inlet pressure, and the compressor discharge temperature, and calculating a synthesized rotor inlet temperature from the ratio unit parameter.

14 Claims, 4 Drawing Sheets

ROTOR INLET TEMPERATURE CONTROL FOR TURBO MACHINE

U.S. GOVERNMENT RIGHTS

The Government may have rights in this invention, pursuant to Contract No. N00019-97-C-0050, awarded by the United States Navy.

BACKGROUND OF THE INVENTION (1) Field of the Invention

The present invention relates to a method for synthesizing gas path rotor inlet temperature in a turbine and a system for performing same.

(2) Description of Related Art

Gas path Rotor Inlet Temperature (RIT) is a critical turbine durability parameter that limits the maximum power (thrust) output of aircraft gas turbine engines. For commercial jet engines, RIT limits thrust at takeoff. For conventional flight military engines, RIT limits thrust at multiple flight conditions including takeoff, combat and supersonic flight. For STOVL (Short Takeoff and Vertical Landing) flight military engines, RIT limits vertical thrust. Increasing RIT improves vehicle performance while potentially causing excessive turbine deterioration and shorter component life. Therefore, accurate knowledge of RIT enables a control system to set engine fuel flow to provide optimum thrust and durability.

What is therefore needed is a method for obtaining an accurate, real time assessment of gas path rotor inlet temperature of turbine engines in operation.

SUMMARY OF THE INVENTION

Accordingly, it is an object of the present invention to provide a method for synthesizing gas path rotor inlet temperature in a turbine and a system for performing same.

In accordance with the present invention, a method for synthesizing rotor inlet temperature in a turbine comprises the steps of determining a burner fuel flow (WFGG), a burner inlet pressure (PS32), and a compressor discharge temperature (T3) of a turbine, calculating a ratio unit parameter from the burner fuel flow, the burner inlet pressure, and the compressor discharge temperature, and calculating a synthesized rotor inlet temperature from the ratio unit parameter.

In further accordance with the present invention, a system for synthesizing a rotor inlet temperature in a turbine comprises means for measuring a burner fuel flow (WFGG), a burner inlet pressure (PS32), and a compressor discharge temperature (T3) of a turbine, and means for receiving the WFGG, the PS32, and the T3, calculating a ratio unit parameter, and calculating a synthesized rotor inlet temperature of the turbine.

DETAILED DESCRIPTION OF THE PREFERRED EMBODIMENT(S)

It is a central purpose of the present invention to provide a method whereby RIT is accurately synthesized and used by a control system to set fuel flow during operation near maximum power conditions.

As is described more fully below, the present invention teaches the thermodynamic derivation of RIT for a turbine. As used herein, "turbine" refers to a turbine or turbine engine. Such a derivation retains accuracy during performance shifts that can occur from deterioration, foreign object damage, extreme installation effects or engine to engine variability.

Figure 1:
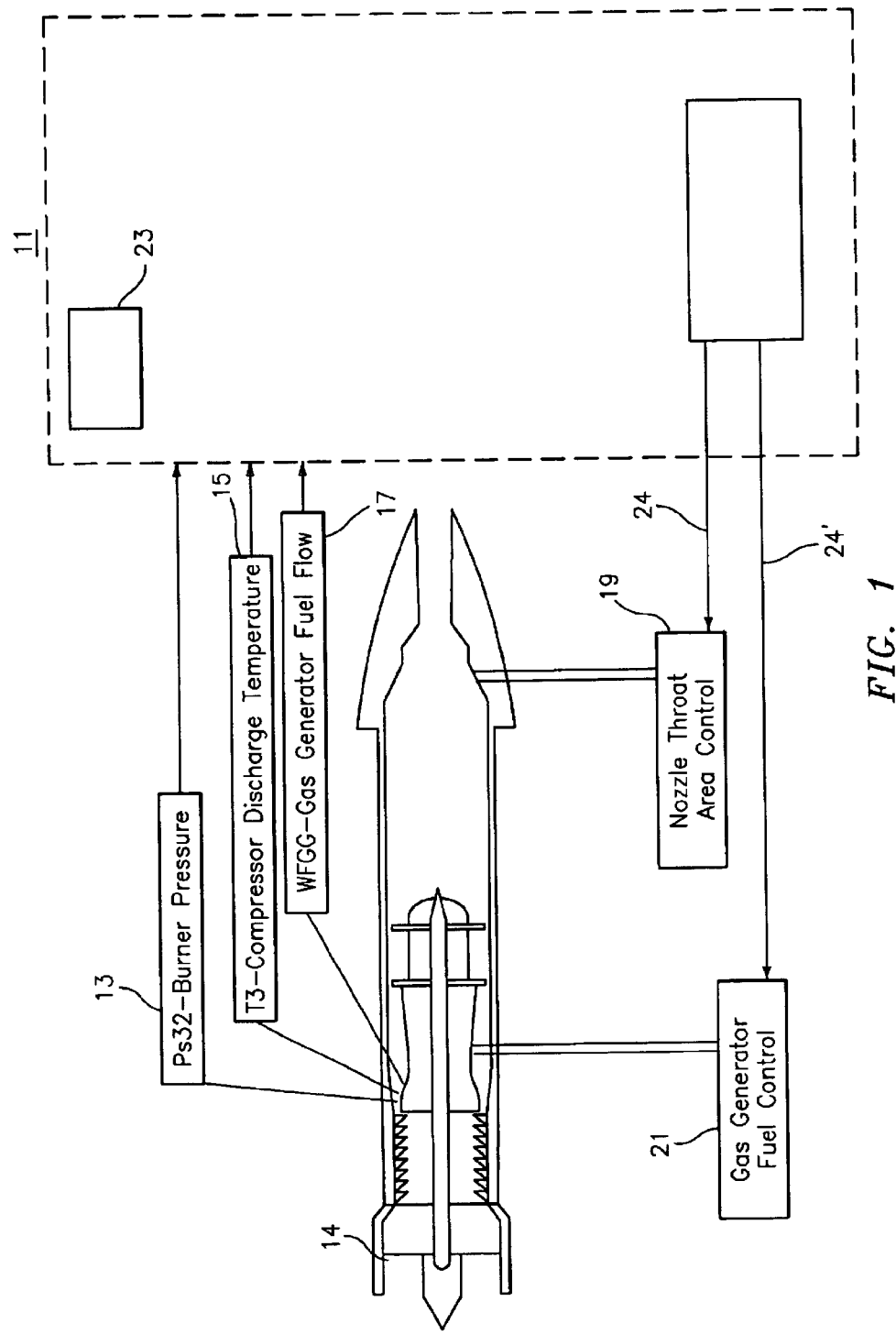
FIG. 1 A diagram of the rotor inlet temperature synthesizing system of the present invention.

In the present invention, RIT is synthesized using 3 inputs—burner fuel flow (WFGG), burner inlet pressure (PS32) and compressor discharge temperature (T3) as illustrated in FIG. 1. Specifically, readings for WFGG, T3, and PS32 are determined. Preferably, these readings are directly measured by WFGG sensor 17, T3 sensor 15, and PS32 sensor 13, or are otherwise synthesized, during the operation of an engine 14 as shown. Such sensors 13, 15, 17 may be any sensor known in the art, including but not limited to thermal, pressure, flow meters, and optical sensors, capable of measuring the aforementioned inputs. Once measured, the inputs derived from the sensors 13, 15, 17 may be manipulated to provide an accurate synthesized RIT as described more fully below. As used herein, "synthesized RIT" refers to a determination of the value of the RIT which is not measured directly, but rather is the result of a computation or computations performed upon one or more sensor inputs.

In a preferred embodiment, inputs derived from the sensors 13, 15, 17 are transmitted to computing device 11. Computing device 11 is a device capable of performing computations upon the inputs derived from the sensors 13, 15, 17. Such computations may involve accessing data stored within a memory device 23 including, but not limited to, random access memory (RAM), read only memory (ROM), and hard drive space. After performing computations upon the inputs derived from the sensors 13, 15, 17, computing device 11 can output any number of control signals 24, 24', ... $24^N$ to regulate the operation of control mechanisms including, but not limited to, gas generator fuel control 21 and nozzle throat area control 19.

There is herein described in detail the manner by which the RIT is synthesized in the present invention. It is a central insight of the present invention that the burner fuel/air ratio of an engine is equivalent to a derived parameter, namely, the ratio unit parameter where the ratio unit parameter is defined to be (WFGG*(T3/519)**EXP)/PS32. The exponent, EXP, in this derived parameter is dependent upon the specific thermodynamic cycle and is chosen to provide the best fit as described below.

Figure 2:
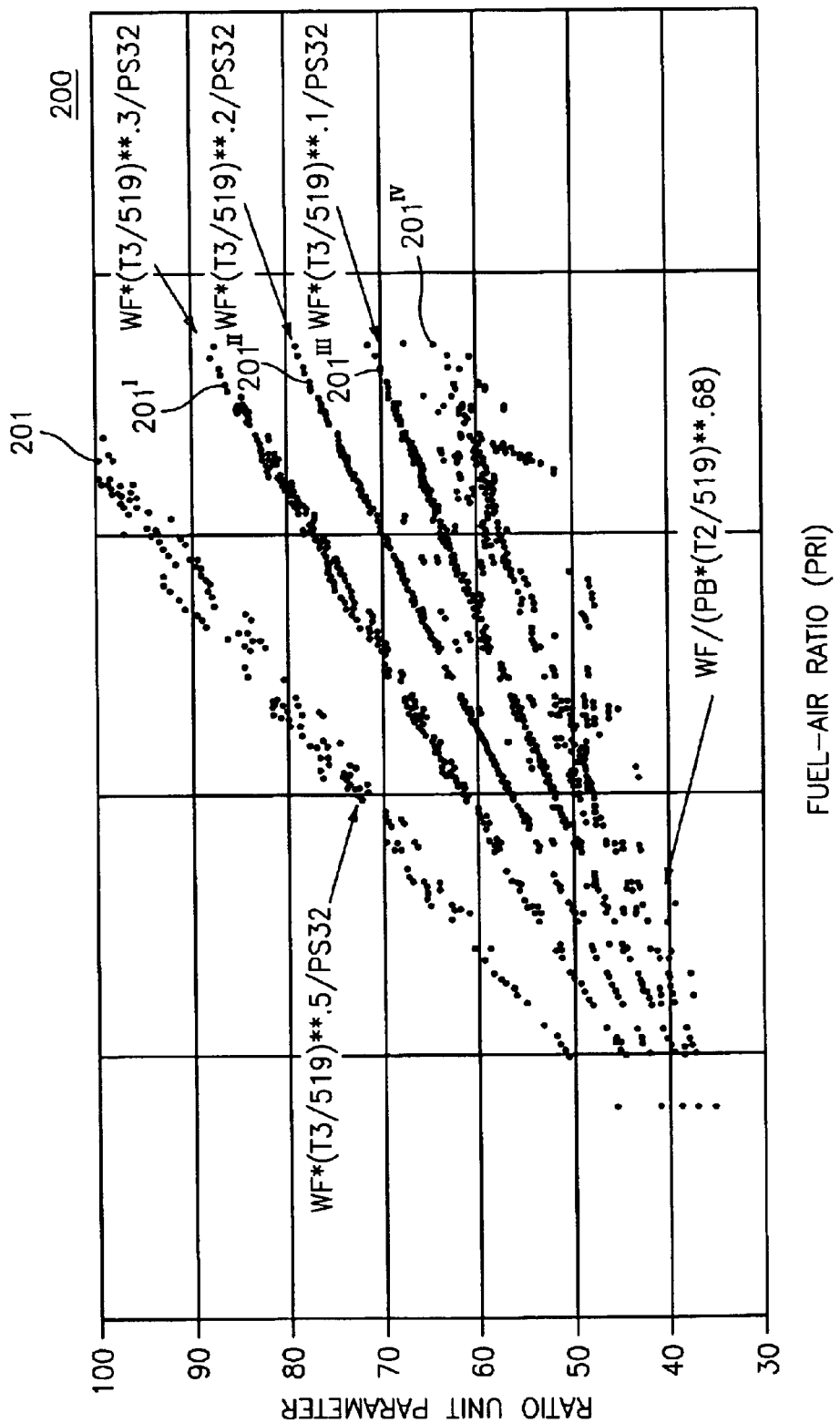
FIG. 2 A graph of exemplary data illustrating the derivation of the exponent used to compute the ratio unit parameter of the present invention.

With reference to FIG. 2, there is illustrated an example of the above noted insight as applied to a test engine. Ratio unit parameter graph 200 is a display of test data for an operating engine. In the present example, the test data is derived from computer models, but may in practice additionally be derived from measurements taken from an existing engine. Ratio unit parameter graph 200 displays on its Y axis the ratio unit parameter, and on its X axis displays the fuel-air ratio. The fuel air ratio is defined as the burner fuel flow divided by the burner air flow. As noted above, ratio unit parameter is equivalent to (WFGG*(T3/519)EXP)/PS32. Ratio unit parameter graph 200 is comprised of a plurality of curves 201, 201', $201^N$. Each of the points comprising plots 201, 201', ... $201^N$ are calculated using the same variable values for WFGG, T3, and PS32. The only difference is that each of the plots 201, 201', . . . 201$^N$**, a different value is chosen for the exponent, EXP. Specifically, in the present example, exponents of 0.1, 0.2, 0.3, and 0.5 were chosen. As is evident from the resulting plots, in the present example, an exponent of "0.2" results in a plot of points which extend in a linear manner with very little variation about such linear expanse. One will further note that deviations from an exponent of "0.2" result in increasing scatter of the data points comprising each of the other plots. Because the points displayed in the present example were computed from a computer model, not one of the measurement points contained in any of the plots contains instrumentation error or other sources of error which may be present in physical systems. As a result, it proves possible in theory, as illustrated, to find an exponent which results in a best fit of data, specifically one whereby the fit of the plotted points about a line collapse onto the single line. It is known to one skilled in the art that, in the event that the plotted points are derived from a physical system in which various sources of error are contained, it would be necessary to apply a statistical test to derive an exponent that would minimize the variability of the desired plot about a line. Regardless, whether derived from a computer model or from measurements in a physical world, the present invention derives an exponent, EXP, such that the aforementioned equation most closely lapses into a single line. It is this exponent that is then used to synthesize RIT as explained more fully below.

Figure 3:
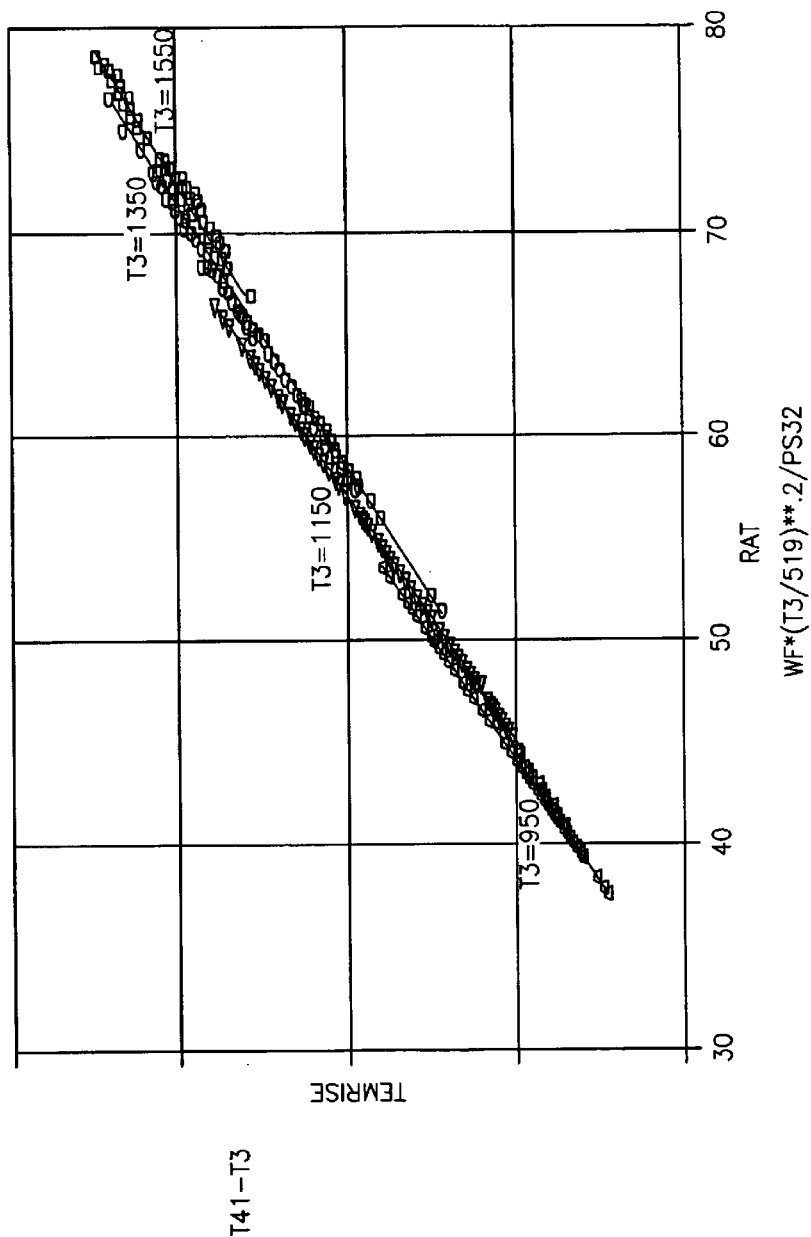
FIG. 3 A graph illustrating the relationship between the computed ratio unit parameter of the present invention and the temperature rise of a burner in a turbine.

It is known that burner temperature rise is a function of fuel/air ratio and compressor discharge temperature (T3). With reference to FIG. 3, there is illustrated in graphical form the relationship between the derived ratio unit parameter described above and a burner temperature rise, defined as the difference between T41 and T3. T41, the synthesized high pressure turbine rotor inlet temperature is equivalent to the synthesized RIT. Using such a graph, it is possible to derive the burner temperature rise, T41–T3, from measured T3, WFGG, and PS32. Because the value for T3 is known, as it is used to compute the derived ratio unit parameter, it may be added to burner temperature rise, thus resulting in any synthesized value for T41.

Such a computation may be entirely mathematical in nature or may involve extracting predefined data from memory device 23. Specifically, once the exponent corresponding to a given engine to be operated as derived as described above, the derived ratio unit parameter may be calculated and manipulated by adding to it the compressor discharge temperature T3 as described above to compute T41. Similarly, the derived ratio unit parameter may be used to perform a lookup from a table contained on memory device 23 whereby the derived ratio unit parameter is fed to memory device 23 as an input, and memory device 23 retrieves and returns a value of T41 based upon the inputted information. In either case, the result is a synthesized valuation of T41.

Figure 4:
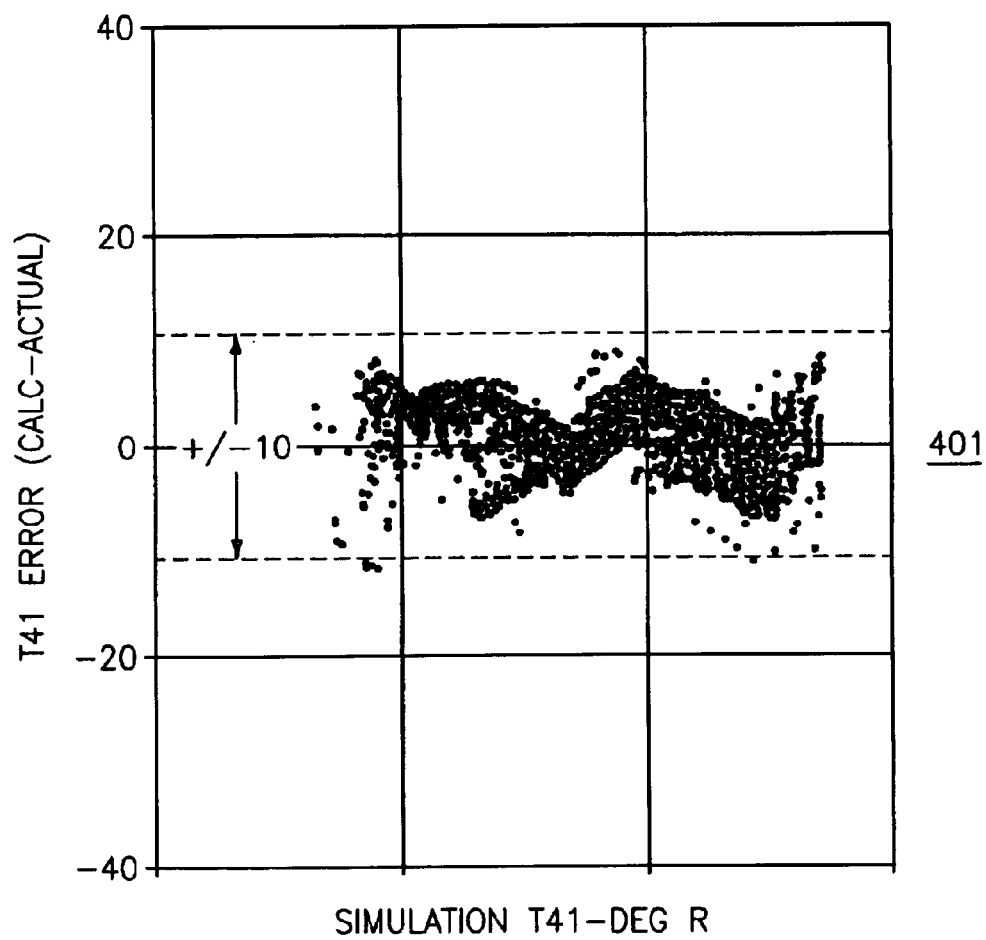
FIG. 4 A plot illustrating exemplary error in computing a synthesized rotor inlet temperature according to the present invention.

With reference to FIG. 4, there is illustrated a T41 error graph 401 derived from test data. In the present T41 error graph 401, the T41 error is plotted on the Y axis while the X axis represents the absolute value of T41 for multiple flight conditions and power settings for a turbine engine. As is evident from T41 error graph 401, the resulting error is no where greater than plus or minus 10° Fahrenheit from the actual measured value. As actual RIT values synthesized from typical turbine engines in operation can exceed 3000°, this T41 error represents approximately 0.33% error.

The above described method is further enhanced to include provisions for determining the impact on RIT of changes in turbine inlet nozzle area (A4) and turbine inlet vane cooling air flow as well as fuel lower heating value. Engine configuration changes, such as turbine inlet area and turbine cooling airflow levels can be accommodated by applying delta impacts to the synthesized RIT, rather than regenerating the ratio unit parameter correlation. Provision for unknown effects that can occur during development of a new engine may be accommodated by a shifter constant and multiplier which allows "zeroing out" of synthesized T41 to Performance Data Reduction. Finally, the T41 signal may be filtered via a time constant to smooth the signal and provide first order heat sink effects.

As a result of the above described methodology of the present invention, there is provided an accurate synthesized RIT. The present method is particularly accurate in the presence of inlet pressure and/or temperature distortion as the present invention utilizes inputs from the exit of the compression system where most inlet distortion has been attenuated. Increased reliability arises from acquiring data from 3 sensors rather than a plurality of inputs.

It is apparent that there has been provided in accordance with the present invention a method for synthesizing gas path rotor inlet temperature in a turbine which fully satisfies the objects, means, and advantages set forth previously herein. Specifically, it is contemplated that one could combine any number of techniques disclosed herein to further satisfy the object of the present invention. While the present invention has been the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of synthesizing rotor inlet temperature in a turbine comprising the steps of:

determining a burner fuel flow (WFGG), a burner inlet pressure (PS32), and a compressor discharge temperature (T3) of a turbine;

calculating a ratio unit parameter from said burner fuel flow, said burner inlet pressure, and said compressor discharge temperature; and calculating a synthesized rotor inlet temperature from said ratio unit parameter.

2. The method of claim 1 wherein said calculating said synthesized rotor inlet temperature comprises the steps of:

calculating a burner temperature rise from said ratio unit parameter; and adding said compressor discharge temperature to said burner temperature rise to obtain a synthesized rotor inlet temperature.

3. The method of claim 1 wherein said calculating said ratio unit parameter comprises the steps of:

setting said ratio unit parameter equal to an equation defined to be (WFGG*(T3/519)**(EXP)/PS32;

generating a plurality of test data points each comprising a WFGG value, a PS32 value, a T3 value, and a fuel air ratio;

deriving an exponent (EXP) such that a plot of said fuel-air ratio against said ratio unit parameter for said test data points exhibits the least variability about a straight line;

using said measured WFGG, said measured PS32, and said measured T3 and said derived exponent to calculate said ratio unit parameter in accordance with said equation.

4. The method of claim 3 wherein generating said plurality of test data points comprises utilizing a computer model.

5. The method of claim 3 wherein generating said plurality of test data points comprises measuring said plurality of test data points from a physical system.

6. The method of claim 1 comprising the additional step of regulating the operation of at least one control mechanism based upon said synthesized rotor inlet temperature.

7. The method of claim 6 wherein said at least one control mechanism is selected from the group consisting of gas generator fuel control and nozzle throat area control.

8. The method of claim 2 wherein said calculating said burner temperature rise comprises the steps of:

inputting said ratio unit parameter into a memory device; and retrieving from said memory device said burner temperature rise.

9. The method of claim 2 comprising the additional step of zeroing out said synthesized rotor inlet temperature.

10. A system for synthesizing a rotor inlet temperature in a turbine comprising:

means for measuring a burner fuel flow (WFGG), a burner inlet pressure (PS32), and a compressor discharge temperature (T3) of a turbine; and means for receiving said WFGG, said PS32, and said T3, calculating a ratio unit parameter, and calculating a synthesized rotor inlet temperature of said turbine.

11. The system of claim 10 wherein said rotor inlet temperature is utilized to calculate at least one control signal.

12. The system of claim 11 wherein said at least one control signal is used to regulate at least one control mechanism.

13. The system of claim 12 said at least one control mechanism is selected from the group consisting of gas generator fuel control and nozzle throat area control.

14. The system of claim 10 additionally comprising a memory device adapted to restore and retrieve a burner temperature rise.

* * * * *